United States Patent
Maruo et al.

(10) Patent No.: US 9,062,596 B2
(45) Date of Patent: Jun. 23, 2015

(54) WASTEGATE VALVE CONTROL DEVICE FOR INTERNAL COMBUSTION ENGINE AND WASTEGATE VALVE CONTROL METHOD FOR INTERNAL COMBUSTION ENGINE

(71) Applicant: Mitsubishi Electric Corporation, Chiyoda-ku, Tokyo (JP)

(72) Inventors: Toshiaki Maruo, Hyogo (JP); Michihisa Yokono, Hyogo (JP); Takahiko Ono, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 56 days.

(21) Appl. No.: 14/055,340

(22) Filed: Oct. 16, 2013

(65) Prior Publication Data

US 2014/0325982 A1 Nov. 6, 2014

(30) Foreign Application Priority Data

May 1, 2013 (JP) .................................. 2013-096245

(51) Int. Cl.
| | | |
|---|---|---|
| *F02D 23/00* | (2006.01) | |
| *F02B 33/44* | (2006.01) | |
| *F02B 37/18* | (2006.01) | |
| *F02D 41/00* | (2006.01) | |
| *F02D 11/10* | (2006.01) | |

(52) U.S. Cl.
CPC ............... *F02B 37/183* (2013.01); *F02B 37/18* (2013.01); *F02D 41/0007* (2013.01); *F02D 11/105* (2013.01); *F02D 2200/0404* (2013.01); *F02D 2200/0406* (2013.01); *F02D 2200/101* (2013.01); *F02D 2200/602* (2013.01); *Y02T 10/144* (2013.01)

(58) Field of Classification Search
CPC .... F02B 37/18; F02B 37/183; F02D 41/0007; Y02T 10/144
USPC .................................................. 60/602, 605.1
See application file for complete search history.

(56) References Cited

U.S. PATENT DOCUMENTS

| | | | |
|---|---|---|---|
| 8,180,553 B2 * | 5/2012 | Buckland et al. ............. | 701/103 |
| 2009/0090106 A1 * | 4/2009 | Muller .......................... | 60/602 |
| 2014/0034026 A1 | 2/2014 | Katsumata et al. | |
| 2014/0060009 A1 * | 3/2014 | Zhang et al. .................... | 60/274 |

FOREIGN PATENT DOCUMENTS

| | | |
|---|---|---|
| JP | 4434057 B2 | 3/2010 |
| JP | 2011-007094 A | 1/2011 |
| JP | 2012-225181 A | 11/2012 |
| JP | 2012-241625 A | 12/2012 |
| JP | 5182436 B2 | 1/2013 |

OTHER PUBLICATIONS

Japanese Office Action (Preliminary Notice of Reasons for Rejection) dated Feb. 12, 2014, Patent Application No. 2013-096245.

* cited by examiner

*Primary Examiner* — Audrey K Bradley
(74) *Attorney, Agent, or Firm* — Sughrue Mion, PLLC

(57) ABSTRACT

Provided are a wastegate valve control device for an internal combustion engine and a wastegate valve control method for an internal combustion engine, which are capable of controlling a wastegate valve (WGV) to a desired open/closed state at low cost even when a reference position of the WGV is shifted from a full-closure position of the WGV. When a target WGV opening (control target value) is equal to or smaller than a threshold opening, a given opening is added to or subtracted from the target WGV opening while the WGV is controlled to perform an opening/closing operation based on the target WGV opening. By monitoring a change in throttle upstream pressure or driving current of a WGV actuator, an optimal target WGV opening corresponding to the shift of the reference position with respect to the full-closure position of the WGV is determined.

13 Claims, 6 Drawing Sheets

FIG. 4

TARGET THROTTLE UPSTREAM-PRESSURE MAP (kPa)

| | | ENGINE RPM [r/min] | | | | | |
|---|---|---|---|---|---|---|---|
| | | 1000 | 2000 | 3000 | 4000 | 5000 | 6000 |
| ACCELERATOR OPENING [%] | 10 | 100 | 100 | 100 | 100 | 100 | 100 |
| | 20 | 100 | 100 | 100 | 100 | 120 | 120 |
| | 30 | 100 | 100 | 100 | 100 | 120 | 140 |
| | 40 | 120 | 120 | 120 | 120 | 140 | 180 |
| | 50 | 120 | 140 | 140 | 120 | 160 | 180 |
| | 60 | 120 | 140 | 140 | 140 | 160 | 200 |
| | 70 | 120 | 160 | 180 | 180 | 200 | 200 |
| | 80 | 120 | 160 | 180 | 180 | 220 | 200 |
| | 90 | 140 | 180 | 200 | 200 | 220 | 240 |
| | 100 | 140 | 200 | 220 | 220 | 240 | 240 |

FIG. 5

TARGET WGV OPENING MAP (%)

| | | ENGINE RPM [r/min] | | | | | |
|---|---|---|---|---|---|---|---|
| | | 1000 | 2000 | 3000 | 4000 | 5000 | 6000 |
| TARGET THROTTLE UPSTREAM PRESSURE [kPa] | 100 | 30 | 20 | 30 | 40 | 45 | 50 |
| | 120 | 20 | 20 | 30 | 40 | 45 | 50 |
| | 140 | 10 | 10 | 25 | 40 | 45 | 50 |
| | 160 | 5 | 5 | 15 | 30 | 40 | 50 |
| | 180 | 0 | 0 | 10 | 20 | 30 | 40 |
| | 200 | 0 | 0 | 0 | 10 | 20 | 30 |
| | 220 | 0 | 0 | 0 | 0 | 10 | 20 |
| | 240 | 0 | 0 | 0 | 0 | 0 | 10 |

WASTEGATE VALVE CONTROL DEVICE FOR INTERNAL COMBUSTION ENGINE AND WASTEGATE VALVE CONTROL METHOD FOR INTERNAL COMBUSTION ENGINE

BACKGROUND OF THE INVENTION

1. Field of the Invention

The present invention relates to a wastegate valve control device for an internal combustion engine, which is to be mounted in a vehicle (for example, a supercharged-engine vehicle), and a wastegate valve control method for an internal combustion engine.

2. Description of the Related Art

Conventionally, for the purpose of improvement of an output of an internal combustion engine (hereinafter referred to as "engine") and the like, there is known a turbocharger including a supercharger operated by rotating a turbine with an exhaust gas, which is provided in an intake path of the engine.

In the turbocharger described above, there is a fear in that a boost pressure may increase to be higher than needed to break the engine when rotation is at high speed under high load. Therefore, an exhaust bypass passage is generally provided in parallel to the turbine. By a wastegate valve provided in the exhaust bypass passage, apart of the exhaust gas flowing through an exhaust path is diverted to pass through the bypass passage to regulate the amount of inflow of the exhaust gas into the turbine. In this manner, a pressure (boost pressure) in the intake path of the engine is controlled to an appropriate level.

Moreover, the wastegate valve is generally operated (performs an opening/closing operation) by driving an actuator (positive-pressure actuator, for example). Specifically, the wastegate valve has a mechanism to operate by the driving of the actuator when the pressure in the intake path (in particular, in a portion located upstream of a throttle valve, in which the pressure increases) of the engine becomes higher than an atmospheric pressure.

Moreover, until the driving of the actuator is enabled, the wastegate valve is normally in a fully-closed state. The wastegate valve is hereinafter referred to as "WGV", and a wastegate valve actuator for operating the WGV is hereinafter referred to as "WGA".

Conventionally, the WGV cannot be operated unless the pressure in the intake path of the engine becomes higher than a threshold value. Specifically, when the above-mentioned pressure is equal to or lower than the threshold value, the WGV cannot be operated. Therefore, the amount of opening of the WGV (WGV opening) cannot be changed.

Therefore, in recent years, there has been proposed a system in which the WGA is motorized to drive the WGV as needed without depending on the pressure in the intake path of the engine so that supercharging by the turbocharger can be limited. In such a system, however, there is generated an error between a detected value by a WGV opening sensor and a true WGV opening (actual WGV opening) due to the effects such as a change with time, which is caused by repeated implementation of the opening/closing operation of the WGV over a long period of time, temperature characteristics of the WGV opening sensor, or a thermal expansion of a structure constituting the WGV.

As a result, a reference position of the WGV (position of the WGV when the detected value by the WGV opening sensor becomes 0%) shifts from a full-closure position of the WGV (position of the WGV when the true WGV opening becomes 0%). Therefore, even when the WGA is operated by the same control amount, the WGV opening shifts, which sometimes prevents the WGV from being controlled to a desired open/closed state. Moreover, if a throttle upstream pressure does not reach a control target value or the position of the WGV further operates from the fully-closed state to a closing side, there is a risk in that a driving current of the WGA becomes an overcurrent. Thus, in the related art, in consideration of the effects of the shift of the reference position with respect to the full-closure position of the WGV, the amount of control of the WGA is corrected.

Specifically, during boost-pressure feedback control, a WGV-opening correction amount is calculated from a deviation between a target boost pressure and an actual boost pressure. Based on the calculated WGV-opening correction amount, the reference position of the WGV is learned (for example, see Japanese Patent No. 4434057).

Further, an estimate value of the WGV opening corresponding to an operation amount of the WGV, an estimate value of a turbo rpm calculated based on the estimate value of the WGV opening and a measured value of an intake-air flow rate, and an estimate value of a compressor flow rate calculated based on the turbo rpm and a measured value of the throttle upstream pressure are respectively calculated by using models. Then, the estimate value of the compressor flow rate and the measured value of the intake-air flow rate are compared with each other. Based on the result of comparison, the relationship between the estimate value of the WGV opening and an operation amount of the WGV is adjusted (for example, see Japanese Patent Application Laid-open Nos. 2012-225181 and 2012-241625).

However, the related art has the following problems.

In the related art described in Japanese Patent No. 4434057, a difference in the amount of change of the WGV opening for the same amount of change of the throttle upstream pressure is not taken into consideration. Therefore, in some cases, the shift of the reference position with respect to the full-closure position of the WGV cannot be accurately corrected based on the WGV-opening correction amount obtained when the WGV opening is in an intermediate range. As a result, there is a problem in that the WGV cannot be controlled to be placed in a desired open/closed state in some cases.

Further, in the related art described in Japanese Patent Application Laid-open Nos. 2012-225181 and 2012-241625, a plurality of complex models are used to obtain the estimate values of the large number of parameters. Therefore, an expensive CPU is required to deal with an increase in a processing load or in a necessary memory capacity. As a result, there is a problem in that cost is disadvantageously increased.

SUMMARY OF THE INVENTION

The present invention has been made to solve the problems described above, and therefore has an object to provide a wastegate valve control device for an internal combustion engine and a wastegate valve control method for an internal combustion engine, which are capable of controlling a WGV to a desired open/closed state at low cost even when a reference position of the WGV is shifted from a full-closure position of the WGV.

According to one embodiment of the present invention, there is provided a wastegate valve control device for an internal combustion engine, the wastegate valve control device including: a control section for performing opening control over a wastegate valve so that a detected opening, which is obtained by a wastegate valve opening sensor, becomes equal to a target opening in order to perform control so that an actual throttle upstream pressure detected by a throttle upstream-pressure detecting section, which corresponds to a pressure in a portion located upstream of a throttle valve provided in an intake path of the internal combustion engine, becomes equal to a target throttle upstream pressure; a throttle upstream-pressure determining section for determining that the opening control by the control section is in an appropriate control state when a difference between the target throttle upstream pressure and the actual throttle upstream pressure falls within an allowable range, and for determining that the opening control by the control section is in an inappropriate control state and determining whether the actual throttle upstream pressure is larger or smaller than the target throttle upstream pressure when the difference falls out of the allowable range; and a target opening calculating section for generating a corrected target opening to obtain the appropriate control state by correcting the target opening by a given opening in a direction in which the actual throttle upstream pressure becomes closer to the target throttle upstream pressure when the target opening is equal to or smaller than a prescribed threshold opening and the throttle upstream-pressure determining section determines that the opening control is in the inappropriate control state, and repeating the correction of the target opening through the opening control performed by the control section using the corrected target opening until the throttle upstream-pressure determining section determines that the opening control is in the appropriate control state.

Further, according to one embodiment of the present invention, there is provided a wastegate valve control method for an internal combustion engine, which is performed by a wastegate valve control device for an internal combustion engine including a control section for performing opening control over a wastegate valve so that a detected opening, which is obtained by a wastegate valve opening sensor, becomes equal to a target opening in order to perform control so that an actual throttle upstream pressure detected by a throttle upstream-pressure detecting section, which corresponds to a pressure in a portion located upstream of a throttle valve provided in an intake path of the internal combustion engine, becomes equal to a target throttle upstream pressure, the wastegate valve control method including: determining that the opening control by the control section is in an appropriate control state when a difference between the target throttle upstream pressure and the actual throttle upstream pressure falls within an allowable range, and determining that the opening control by the control section is in an inappropriate control state and determining whether the actual throttle upstream pressure is larger or smaller than the target throttle upstream pressure when the difference falls out of the allowable range; and generating a corrected target opening to obtain the appropriate control state by correcting the target opening by a given opening in a direction in which the actual throttle upstream pressure becomes closer to the target throttle upstream pressure when the target opening is equal to or smaller than a prescribed threshold opening and when it is determined that the opening control is in the inappropriate control state, and repeating the correction of the target opening through the opening control performed by the control section using the corrected target opening until it is determined that the opening control is in the appropriate control state.

According to the present invention, when the target WGV opening (control target value) is equal to or smaller than the prescribed threshold opening, the prescribed opening is added to or subtracted from the target WGV opening while the WGV is controlled to perform the opening/closing operation based on the target WGV opening. In this manner, an optimal target WGV opening corresponding to the shift of the reference position with respect to the full-closure position of the WGV is determined. As a result, there can be obtained the wastegate valve control device for an internal combustion engine and the wastegate valve control method for an internal combustion engine, which are capable of controlling the WGV to the desired open/closed state at low cost even when the reference position of the WGV is shifted from the full-closure position of the WGV.

BRIEF DESCRIPTION OF THE DRAWINGS

In the accompanying drawings:

FIG. 4 is an explanatory table showing an example of a target throttle upstream-pressure map for calculating a target throttle upstream pressure according to the first embodiment of the present invention;

FIG. 5 is an explanatory table showing an example of a target WGV opening map for calculating a target WGV opening according to the first embodiment of the present invention;

DETAILED DESCRIPTION OF THE PREFERRED EMBODIMENT

Figure 1:
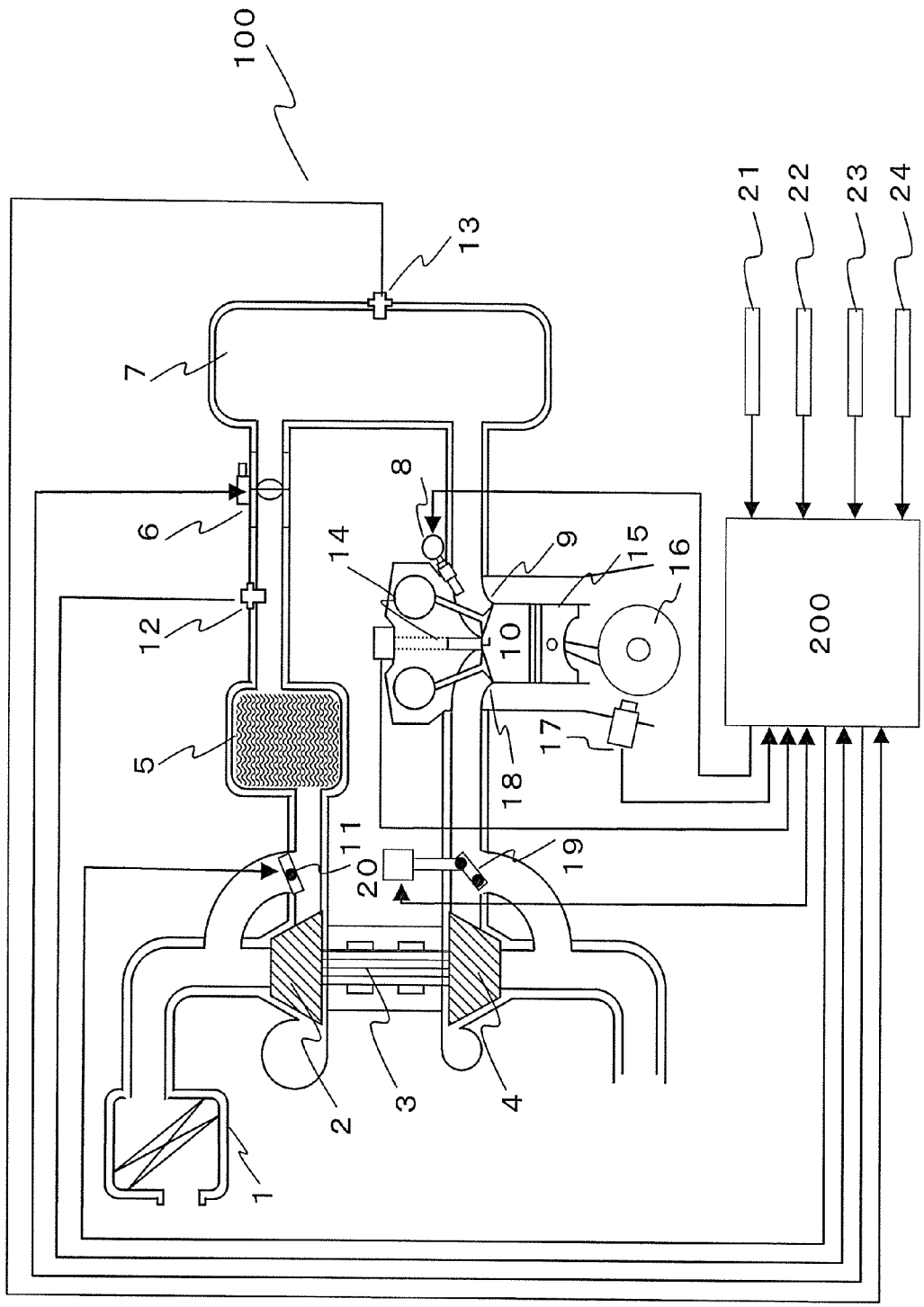
FIG. 1 is an overall configuration diagram of an internal combustion engine system to which a wastegate valve control device for an internal combustion engine according to a first embodiment of the present invention is applied.

Now, a wastegate valve control device for an internal combustion engine and a wastegate valve control method for an internal combustion engine according to a preferred embodiment of the present invention are described referring to the drawings. In the description of the drawings, the same component is denoted by the same reference symbol, and therefore the overlapping description thereof is herein omitted.

First Embodiment

Figure 8:
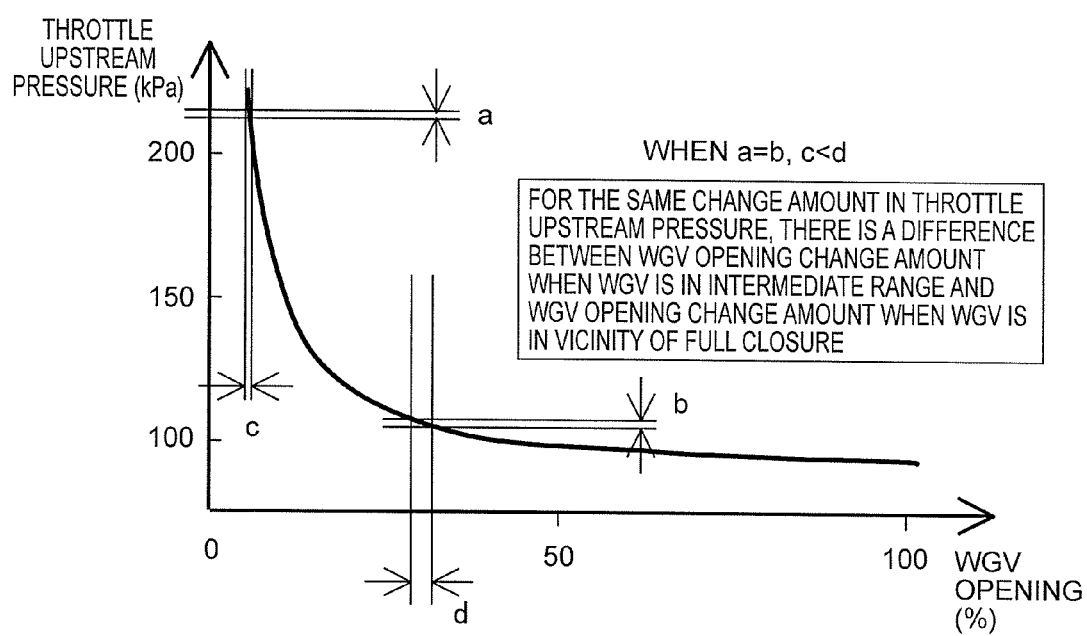
FIG. 8 is an explanatory graph showing an example of a change in throttle upstream pressure with respect to a WGV opening when the related art is applied.

First, in order to clearly describe technical features of the present invention, the problems of the related art described above are now described in detail referring to FIG. 8. FIG. 8 is an explanatory graph showing an example of a change in a throttle upstream pressure with respect to a WGV opening when the related art is applied.

The "WGV opening" means an index indicating an open/closed state of a WGV, and has a value ranging from 0% to 100%. For example, when the WGV opening is 0%, the WGV is in a fully-closed state. When the WGV opening is 100%, the WGV is in a fully-open state. Specifically, as the WGV opening increases, the WGV is operated toward the opening side.

FIG. 8 shows a change in the throttle upstream pressure (vertical axis) with respect to the WGV opening (horizontal axis). As shown in FIG. 8, it is verified that a gradient of a curve indicating the throttle upstream pressure with respect to the WGV opening differs depending on the WGV opening.

Specifically, for example, the case where a change amount a in the throttle upstream pressure corresponding to the WGV opening in the vicinity of full closure (in the vicinity of 0%) and a change amount b in the throttle upstream pressure corresponding to the WGV opening in an intermediate range are equal to each other (a=b) is supposed.

In the above-mentioned case, when a change amount c in the WGV opening corresponding to the change amount a in the throttle upstream pressure and a change amount d in the WGV opening corresponding to the change amount b in the throttle upstream pressure are compared with each other, the change amount d is larger (c<d). Specifically, the opening change amount in the WGV opening corresponding to the same pressure change amount in the throttle upstream pressure becomes larger when the WGV opening falls within the intermediate range.

Thus, in the related art, there is a difference between a shift amount of a reference position with respect to a full-closure position of the WGV, which is obtained when the WGV opening is in the intermediate range, and a shift amount of the reference position with respect to the full-closure position of the WGV, which is obtained when the WGV opening is in the vicinity of full closure. Therefore, in some cases, a shift of the reference position with respect to the full-closure position of the WGV cannot be accurately corrected based on the WGV-opening correction amount obtained when the WGV opening is in the intermediate range.

As a result of intensive studies to solve the problems of the related art described above, the inventors of the present invention have found the following. By sequentially repeating the following procedures (1) to (3), a target WGV opening optimal for the shift of the reference position with respect to the full-closure position of the WGV is determined to enable the control for placing the WGV in the desired open/closed state.

Procedure (1)

When the target WGV opening (control target value) is equal to or smaller than a prescribed threshold opening, the WGV is controlled to perform an opening/closing operation based on the target WGV opening. The WGV opening in the vicinity of full closure, which has a small change amount in the opening with respect to the pressure change amount described above, may be prescribed as the threshold opening.

Procedure (2)

Based on the result of detection by a current detecting section for detecting a driving current of a WGA or a throttle upstream pressure detecting section for detecting a throttle upstream pressure during the opening/closing operation of the WGV, a given opening is added to or subtracted from the target WGV opening.

Procedure (3)

The target WGV opening after the addition/subtraction is obtained as anew target WGV opening, and then the procedure returns to the procedure (1).

Next, the wastegate valve control device for an internal combustion engine according to a first embodiment of the present invention is described referring to FIG. 1. FIG. 1 is an overall configuration diagram of an internal combustion engine system 100 to which the wastegate value control device for an internal combustion engine according to the first embodiment of the present invention is applied. The wastegate valve control device for an internal combustion engine according to the first embodiment is included in an ECU 200.

In FIG. 1, outside air (air) is supplied to an air cleaner 1 provided in the internal combustion engine system 100. The outside air supplied to the air cleaner 1 is used for supercharging by the rotation of a supercharger 2. The supercharger 2 is connected to an exhaust turbine 4 through an intermediation of a turbine shaft 3. The exhaust turbine 4 is rotated by energy of an exhaust gas.

The outside air used for supercharging by the supercharger 2 flows through an intake path. Specifically, the outside air flows through an intercooler 5, a throttle valve 6 for regulating an intake amount, and a surge tank 7 in the stated order so as to be mixed with a fuel supplied through fuel injection by an injector 8 to become an air-fuel mixture. The air-fuel mixture is supplied to a combustion chamber 10 through an intake valve 9.

In a bypass passage which connects an upstream side and a downstream side of the supercharger 2 to each other, an air bypass valve 11 for controlling a flow rate of the outside air flowing through the bypass passage is provided. In a passage which connects the intercooler 5 and the surge tank 7 to each other, a throttle-valve upstream pressure sensor 12 for detecting a pressure in a portion located upstream of the throttle valve 6 (pressure on the downstream side of the supercharger 2) is provided. Further, an intake-pipe internal-pressure sensor 13 for detecting a pressure in the tank is provided to the surge tank 7.

The air-fuel mixture supplied to the combustion chamber 10 is combusted by ignition with a spark plug 14 to generate a combustion gas. A piston 15 to which a crankshaft 16 is connected is provided in the combustion chamber 10. The piston 15 moves vertically by the generated combustion gas to rotate the crankshaft 16.

A crank plate (not shown) having a projection is mounted to the crankshaft 16. By detecting the projection, a crank-angle sensor 17 detects an rpm and a crank-angle position of the crankshaft 16.

The combustion gas in the combustion chamber 10 is exhausted through an exhaust valve 18. The combustion gas rotates the exhaust turbine 4 when exhausted as an exhaust gas. A wastegate valve (WGV) 19 for controlling an exhaust-gas flow rate to be supplied to the exhaust turbine 4 is provided in a bypass passage which connects the upstream side and the downstream side of the exhaust turbine 4 to each other.

The WGV 19 is connected to a wastegate valve actuator (WGA) 20. By driving the WGA 20, the WGV 19 operates. With the operation of the WGV 19, an opening area of the bypass passage (that is, the exhaust-gas flow rate in the bypass passage) is adjusted. In this manner, by the operation of the WGV 19, the driving force for the exhaust turbine 4 is adjusted. Thus, the pressure in the portion located upstream of the throttle valve 6 (upstream pressure) can be changed as desired.

The internal combustion engine system 100 further includes an intake air temperature sensor 21 for detecting an intake air temperature, a throttle position sensor 22 for detecting an opening of the throttle valve 6, a water-temperature sensor 23 for detecting a temperature of cooling water for the internal combustion engine, and an accelerator position sensor 24 for detecting a depression amount of an accelerator (accelerator opening) by a driver.

The ECU 200 includes various I/F circuits and a microcomputer. The microcomputer includes an A/D converter. In addition, the microcomputer further includes a ROM area, a RAM area, and the like as a storage section. The A/D converter converts an analog signal into a digital signal. The ROM area stores a control program and a control constant, whereas the RAM area stores a variable when the control program is executed.

Moreover, the ECU 200 performs overall control over the internal combustion engine system 100 based on the results of detection by the various sensors described above. Specifically, the ECU 200 computes various parameters such as an engine rpm (rotation speed), an ignition timing, and a fuel injection amount. Further, the ECU 200 controls the driving of the various valves such as the throttle valve 6, the air bypass valve 11, and the WGV 19, the WGA 20, and the like.

Figure 2:
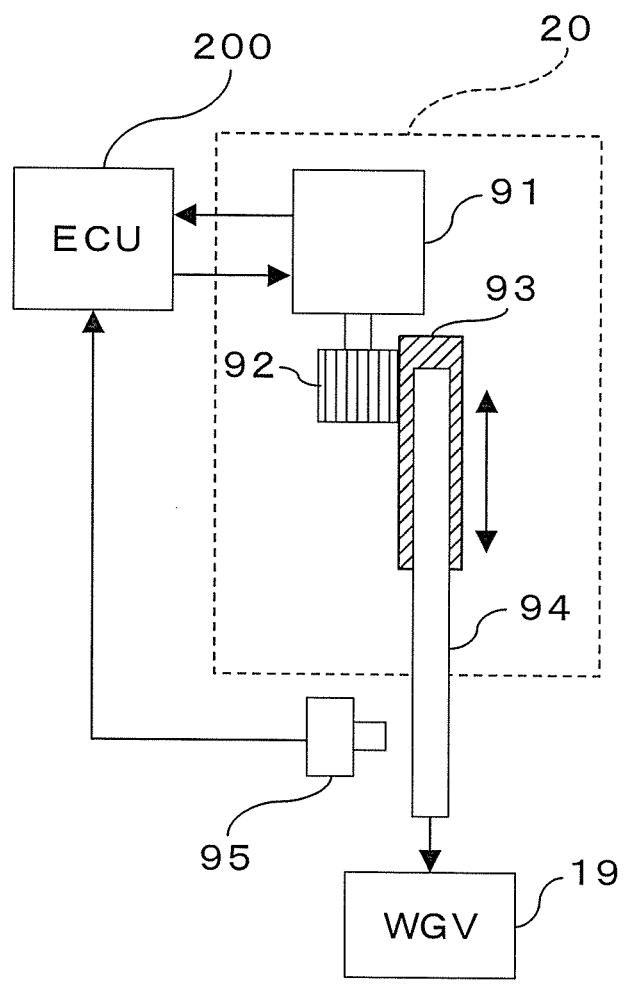
FIG. 2 is a configuration diagram of a wastegate valve actuator according to the first embodiment of the present invention.

Next, an example of a configuration of the WGA 20 is described referring to FIG. 2. FIG. 2 is a configuration diagram of the WGA 20 according to the first embodiment of the present invention. The WGA 20 illustrated in FIG. 2 is an electrically-driven actuator.

In FIG. 2, the WGA 20 includes a motor 91, a motor gear 92, a screw mechanism 93, and a rod 94. A position sensor (WGV opening sensor) 95 for detecting a position of the rod 94 is provided.

The motor gear 92 is connected to the motor 91. The motor gear 92 is held in contact with the screw mechanism 93. The rod 94 is connected to the screw mechanism 93. The screw mechanism 93 operates in accordance with the rotation of the motor gear 92. As a result, the rod 94 operates in a vertical direction (vertical direction of the drawing sheet). A distal end of the rod 94 is connected to the WGV 19. By the vertical operation of the rod 94, the WGV 19 performs the opening/closing operation.

As described above, the ECU 200 controls the driving of the WGA 20. Specifically, based on a control command from the ECU 200, a positive or negative driving current is supplied to the motor 91. Along with the supply of the current, the motor gear 92 rotates to operate the screw mechanism 93. In this case, the rod 94 operates vertically to cause the WGV 19 to perform the opening/closing operation. The ECU 200 detects the driving current supplied to the motor 91 (driving current of the WGA 20).

As described above, the vertical operation of the rod 94 and the opening/closing operation of the WGV 19 correspond to each other. Therefore, based on the position of the rod 94, which is detected by the WGV opening sensor 95, the WGV opening of the WGV 19 can be detected. The ECU 200 acquires the result of detection by the WGV opening sensor 95.

Figure 3:
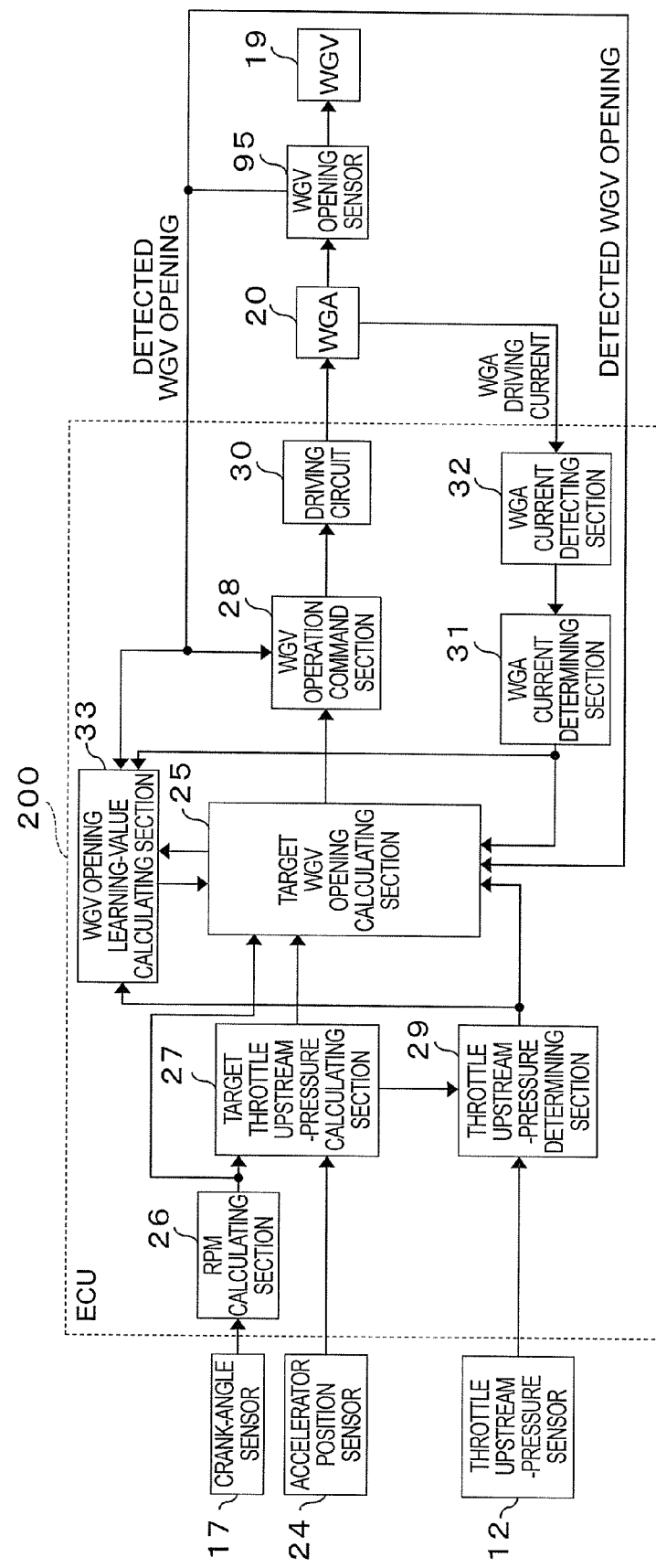
FIG. 3 is a configuration block diagram of the wastegate valve control device for an internal combustion engine according to the first embodiment of the present invention.

Next, control for adjustment of the WGV opening (control over the opening/closing operation of the WGV 19) by the wastegate valve control device for an internal combustion engine is described referring to FIG. 3. FIG. 3 is a configuration block diagram of the wastegate valve control device for an internal combustion engine according to the first embodiment of the present invention. In FIG. 3, the throttle-valve upstream pressure sensor 12, the crank-angle sensor 17, the WGV 19, the WGA 20, the accelerator position sensor 24, and the WGV opening sensor 95 are also illustrated.

The wastegate valve control device for an internal combustion engine included in the ECU 200 includes a target WGV opening calculating section 25, an rpm calculating section 26, a target throttle upstream-pressure calculating section 27, a WGV operation command section 28, a throttle upstream-pressure determining section 29, a driving circuit 30, a WGA current determining section 31, and a WGA current detecting section 32.

First, the rpm calculating section 26 calculates an rpm of the crankshaft 16 (engine rpm) based on the result of detection by the crank-angle sensor 17. The target throttle upstream-pressure calculating section 27 calculates a target throttle upstream pressure (control target value) based on the engine rpm calculated by the rpm calculating section 26 and the accelerator opening detected by the accelerator position sensor 24.

An example of a method in which the target throttle upstream-pressure calculating section 27 calculates the target throttle upstream pressure is now specifically described referring FIG. 4. FIG. 4 is an explanatory table showing an example of a target throttle upstream-pressure map for calculating the target throttle upstream pressure according to the first embodiment of the present invention. On the map shown in FIG. 4, a unit of the target upstream pressure is [kPa].

As shown in FIG. 4, on the target throttle upstream-pressure map, the engine rpm [r/min], the accelerator opening [%], and the target throttle upstream pressure [kPa] are associated with one another. The target throttle upstream-pressure calculating section 27 calculates (selects) the target throttle upstream pressure corresponding to the engine rpm calculated by the rpm calculating section 26 and the accelerator opening detected by the accelerator position sensor 24 in accordance with the map.

Specifically, for example, the case where the engine rpm is 2,000 [r/min] and the accelerator opening is 50 [%] is supposed. In such a case, the target throttle upstream pressure calculated by the target throttle upstream-pressure calculating section 27 in accordance with the map becomes 140 [kPa]. The target throttle upstream-pressure calculating section 27 may calculate the target throttle upstream pressure without using the target throttle upstream-pressure map, for example, in accordance with a prescribed physical model.

The target WGV opening calculating section 25 calculates the target WGV opening (control target value) based on the engine rpm calculated by the rpm calculating section 26 and the target throttle upstream pressure calculated by the target throttle upstream-pressure calculating section 27.

An example of a method in which the target WGV opening calculating section 25 calculates the target WGV opening is now described referring to FIG. 5. FIG. 5 is an explanatory table showing an example of a target WGV opening map for calculating the target WGV opening according to the first embodiment of the present invention.

As shown in FIG. 5, on the target WGV opening map, the engine rpm [r/min], the target throttle upstream pressure [kPa], and the target WGV opening [%] are associated with one another. The target WGV opening calculating section 25 calculates (selects) the target WGV opening corresponding to the engine rpm calculated by the rpm calculating section 26 and the target throttle upstream pressure calculated by the target throttle upstream-pressure calculating section 27 in accordance with the map.

Specifically, for example, the case where the engine rpm is 2,000 [r/min] and the target throttle upstream pressure is 140 [kPa] is supposed. In such a case, the target WGV opening calculated by the target WGV opening calculating section 25 in accordance with the map is 10 [%]. The target WGV opening calculating section 25 may calculate the target WGV opening without using the target WGV opening map, for example, in accordance with a prescribed physical model. The target WGV opening contained in the target WGV opening map is corrected in accordance with a learning value stored by a WGV opening learning-value calculating section 33 described later in the storage section.

The WGV operation command section 28 drives the WGA 20 by supplying the driving current to the driving circuit 30 so that the target WGV opening calculated by the target WGV opening calculating section 25 matches with the WGV opening (detected WGV opening) detected by the WGV opening sensor 95. By the feedback control described above, the detected WGV opening is controlled so as to be equal to the target WGV opening. The contents described above correspond to an operation for controlling the WGV opening when the wastegate valve control device for an internal combustion engine performs a normal operation.

Here, the case where a reference position of the WGV 19 is shifted to the opening side with respect to the full-closure position is supposed. In such a case, the target WGV opening calculated by the target WGV opening calculating section 25 is required to be corrected so as to correspond to the shift of the reference position with respect to the full-closure position of the WGV 19. Therefore, if the operation of the WGV 19 is controlled based on the target WGV opening before the correction, the true WGV opening is shifted from the target WGV opening (detected WGV opening). Thus, there is a risk in that an actual throttle upstream pressure (throttle upstream pressure detected by the throttle-valve upstream pressure sensor 12) is not appropriately controlled based on the target throttle upstream pressure.

On the other hand, the case where the reference position of the WGV 19 is shifted toward the closing side with respect to the full-closure position is supposed. Also in such a case, the target WGV opening calculated by the target WGV opening calculating section 25 is required to be corrected so as to correspond to the shift of the reference position with respect to the full-closure position of the WGV 19. Therefore, if the operation of the WGV 19 is controlled based on the target WGV opening before the correction, the WGV 19 is further operated to the closing side although the true WGV opening is 0%. Thus, there is a risk in that the driving current of the WGA 20 becomes an overcurrent.

Accordingly, in order to solve the problem described above, the wastegate valve control device according to the first embodiment further performs an operation for controlling the WGV opening as follows.

The throttle upstream-pressure determining section 29 compares the target throttle upstream pressure calculated by the target throttle upstream-pressure calculating section 27 and the actual throttle upstream pressure to determine which is larger.

Here, the case where the target WGV opening calculated by the target WGV opening calculating section 25 is equal to or smaller than a threshold opening and the actual throttle upstream pressure is smaller than the target throttle upstream pressure is supposed. In such a case, the WGV 19 is operated to the closing side to decrease the true WGV opening. As a result, the actual throttle upstream pressure becomes larger to change in a direction closer to the target throttle upstream pressure.

Specifically, the target WGV opening calculating section 25 subtracts, from the target WGV opening calculated by itself, a prescribed first opening (for example, 0.5%) for fine adjustment in a direction in which the opening decreases, thereby obtaining a first corrected target WGV opening. The WGV operation command section 28 drives the WGA 20 based on the first corrected target WGV opening, thereby operating the WGV 19 to the closing side.

When the actual throttle upstream pressure is smaller than the target throttle upstream pressure even after the WGV 19 is operated, the target WGV opening calculating section 25 further subtracts the first opening from the first corrected target WGV opening to obtain a second corrected target WGV opening. The WGV operation command section 28 drives the WGA 20 based on the second corrected target WGV opening, thereby further operating the WGV 19 to the closing side.

The target WGV opening calculating section 25 repeats the procedure described above until the actual throttle upstream pressure becomes equal to the target throttle upstream pressure. By the repeated processing described above, the actual throttle upstream pressure increases so as to be ultimately equal to the target throttle upstream pressure. As a result, by controlling the WGV opening using the optimal corrected target WGV opening, the actual throttle upstream pressure is appropriately controlled based on the target throttle upstream pressure.

On the other hand, the case where the target WGV opening calculated by the target WGV opening calculating section 25 is equal to or smaller than the threshold opening and the actual throttle upstream pressure is larger than the target throttle upstream pressure is supposed. In such a case, the WGV 19 is operated to the opening side to increase the true WGV opening. As a result, the actual throttle upstream pressure becomes smaller to change in a direction closer to the target throttle upstream pressure.

Specifically, the target WGV opening calculating section 25 adds, to the target WGV opening calculated by itself, a prescribed second opening (for example, 0.5%) for fine adjustment in a direction in which the opening decreases, thereby obtaining the first corrected target WGV opening. The WGV operation command section 28 drives the WGA 20 based on the first corrected target WGV opening to operate the WGV 19 to the opening side. Subsequently, the procedure similar to that performed in the case where the target throttle upstream pressure is larger than the actual throttle upstream pressure as described above is repeated.

The target WGV opening calculating section 25 repeats the procedure described above until the actual throttle upstream pressure becomes equal to the target throttle upstream pressure. By the repeated processing described above, the actual throttle upstream pressure decreases so as to be ultimately equal to the target throttle upstream pressure. As a result, by controlling the WGV opening using the optimal corrected target WGV opening, the actual throttle upstream pressure is appropriately controlled based on the target throttle upstream pressure.

As described above, even when the reference position of the WGV 19 is shifted to the opening side with respect to the full-closure position, the optimal corrected target WGV opening, which allows the actual throttle upstream pressure to be appropriately controlled, is obtained by adding or subtracting the opening to/from the target WGV opening for adjustment. Specifically, the shift between the WGV opening controlled based on the optimal corrected target WGV opening and the true WGV opening is suppressed. Thus, the actual throttle upstream pressure is appropriately controlled.

Moreover, the WGV is controlled to continuously perform the opening/closing operation until the WGA 20 is directly driven to appropriately control the actual throttle upstream pressure. Therefore, the true WGV opening is not required to be estimated. Thus, complex computation processing for estimating the true WGV opening is not required to be performed. Accordingly, a processing load and a memory capacity can be reduced, and hence the present invention can be realized even with an inexpensive CPU.

Here, the case where the target WGV opening calculated by the target WGV opening calculating section 25 is equal to or smaller than the prescribed threshold opening and the driving current of the WGA 20 is an overcurrent is supposed. In such a case, the WGV 19 further operates to the closing side even though the true WGV opening is 0%. Therefore, by the operation of the WGV 19 to the opening side, the overcurrent state is eliminated.

Specifically, the target WGV opening calculating section 25 adds, to the target WGV opening calculated by itself, a prescribed third opening (for example, 0.5%) for fine adjustment in a direction in which the opening increases, thereby obtaining the first corrected target WGV opening. Moreover, the WGV operation command section 28 drives the WGA 20 based on the first corrected target WGV opening to operate the WGV 19 to the opening side. Then, by the operation described above, the driving current of the WGA 20 becomes closer to a normal state. Subsequently, the same procedure as that performed in the case where the target throttle upstream pressure is larger than the actual throttle upstream pressure as described above is repeated.

The target WGV opening calculating section 25 repeats the procedure described above to ultimately obtain the optimal corrected target WGV opening to eliminate the overcurrent state.

Even when the reference position of the WGV 19 is shifted to the opening side with respect to the full-closure position to bring about the overcurrent state as described above, the opening is added to the target WGV opening for adjustment. As a result, the optimal corrected target WGV opening to eliminate the overcurrent state is obtained. Specifically, the shift between the WGV opening controlled based on the optimal corrected target WGV opening and the true WGV opening is suppressed, and therefore the overcurrent state is eliminated. Thus, the WGA 20 is protected from the overcurrent state, and therefore, for example, an excessively large load is prevented from being applied to the motor 91 included in the WGA 20 to burn out the motor 91. Moreover, the shift between the WGV opening controlled based on the optimal corrected target WGV opening and the true WGV opening is suppressed. Therefore, similarly, the actual throttle upstream pressure is appropriately controlled.

After the correction of the target WGV opening by the target WGV opening calculating section 25 is terminated, the WGV opening learning-value calculating section 33 calibrates the WGV opening sensor 95 for learning so that a currently-detected value by the WGV opening sensor 95 (detected WGV opening) matches with a current value of the corrected target WGV opening. Further, the WGV opening learning-value calculating section 33 stores a calibration value, which is obtained when the WGV opening sensor 95 is calibrated, as a learning value in the storage section. As an example of the storage section, a backup memory or a non-volatile memory such as an EEPROM is given.

The target WGV opening calculating section 25 uses the learning value stored in the storage section for a next or subsequent opening/closing operation of the WGV 19 to correct the shift between the detected WGV opening and the true WGV opening. In this manner, during the next opening/closing operation of the WGV 19, the actual throttle upstream pressure can be reliably controlled with high accuracy from the beginning.

Figure 6:
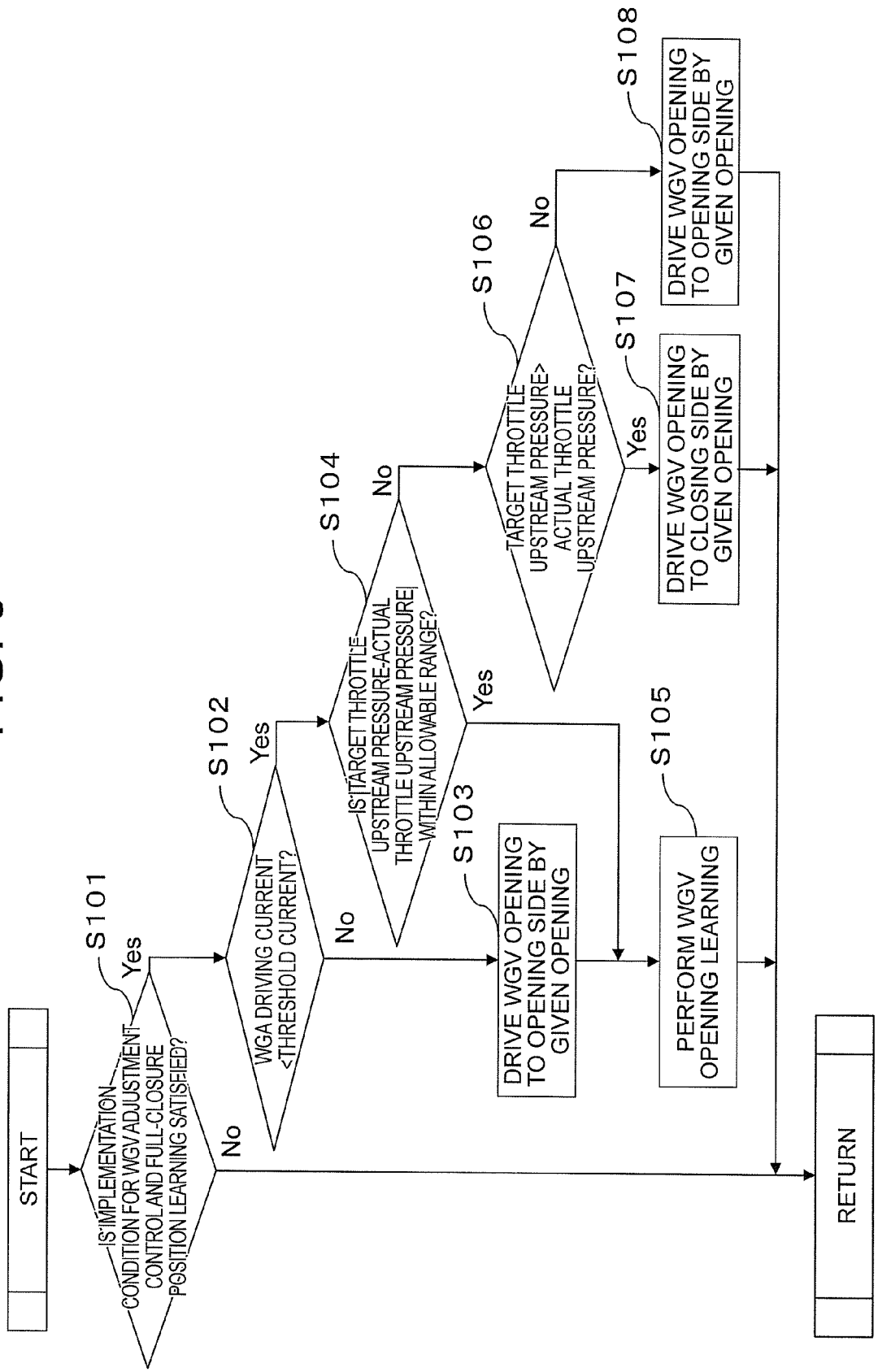
FIG. 6 is a flowchart illustrating WGV control processing performed by the wastegate valve control device for an internal combustion engine according to the first embodiment of the present invention.

Next, an operation procedure series of the wastegate valve control device for an internal combustion engine according to the first embodiment is described referring to a flowchart of FIG. 6. FIG. 6 is a flowchart illustrating WGV control processing performed by the wastegate valve control device for an internal combustion engine according to the first embodiment of the present invention.

Specifically, the flowchart of FIG. 6 illustrates processing for adjusting and controlling the WGV opening based on the deviation between the actual throttle upstream pressure and the target throttle upstream pressure and the driving current of the WGA 20 and for learning the reference position of the WGV 19. The processing series of the flowchart is repeatedly executed by the ECU 200 for each prescribed processing cycle.

First, in Step S101, the target WGV opening calculating section 25 determines whether or not a condition for implementing adjustment control of the WGV opening and learning of the reference position of the WGV 19 is satisfied. Specifically, in Step S101, the target WGV opening calculating section 25 determines that the implementation condition is satisfied when the target WGV opening calculated (corrected) by itself is equal to or smaller than the threshold opening, and determines that the implementation condition is not satisfied when the WGV opening is larger than the threshold opening.

Then, in Step S101, when the target WGV opening calculating section 25 determines that the implementation condition is not satisfied (that is, No), the processing series is terminated and proceeds to a next processing cycle. On the other hand, when the target WGV opening calculating section 25 determines that the implementation condition is satisfied (that is, Yes), the processing series proceeds to Step S102.

Next, in Step S102, the WGA current determining section 31 determines whether or not the driving current of the WGA 20, which is detected by the WGA current detecting section 32, is the overcurrent. When the WGV 19 is further driven to the closing side even though the WGV 19 is in the fully-closed state, the driving current of the WGA 20 continues increasing, resulting in the overcurrent.

Specifically, in Step S102, when the driving current of the WGA 20 is equal to or larger than a prescribed threshold current, the WGA current determining section 31 determines that an overcurrent state is brought about. When the driving current of the WGA 20 is smaller than the prescribed threshold current, the WGA current determining section 31 determines that the overcurrent state is not brought about. For example, a current value which may possibly cause breakage may be defined as the threshold current in accordance with operation characteristics of the motor 91.

Then, in Step S102, when the WGA current determining section 31 determines that the driving current of the WGA 20 is equal to or larger than the prescribed threshold current (that is, No), the processing series proceeds to Step S103. In this case, although the WGV 19 is in the fully-closed state, the WGV 19 further operates to the closing side.

Next, in Step S103, the target WGV opening calculating section 25 adds the third opening to the target WGV opening calculated by itself. Then, the processing series proceeds to Step S105. In this case, the WGV 19 operates after changing the direction from the closing side to the opening side. As a result, the driving current of the WGA 20 decreases so as to become closer to the normal state.

Next, in Step S105, when the overcurrent state is eliminated, the WGV opening learning-value calculating section 33 stores the calibration value, which is obtained when the WGV opening sensor 95 is calibrated, as the learning value in the storage section for update. Moreover, in Step S105, the target WGV opening calculating section 25 corrects the shift between the detected WGV opening and the true WGC opening based on the learning value newly updated in the storage section. Subsequently, the processing series is terminated. Then, the processing series proceeds to a next processing cycle.

On the other hand, in Step S102, when the WGA current determining section 31 determines that the driving current of the WGA 20 is smaller than the prescribed threshold current (that is, Yes), the processing series proceeds to Step S104.

Next, in Step S104, the throttle upstream-pressure determining section 29 determines whether or not the opening control by the WGV operation command section 28 is in an appropriate control state.

Figure 7:
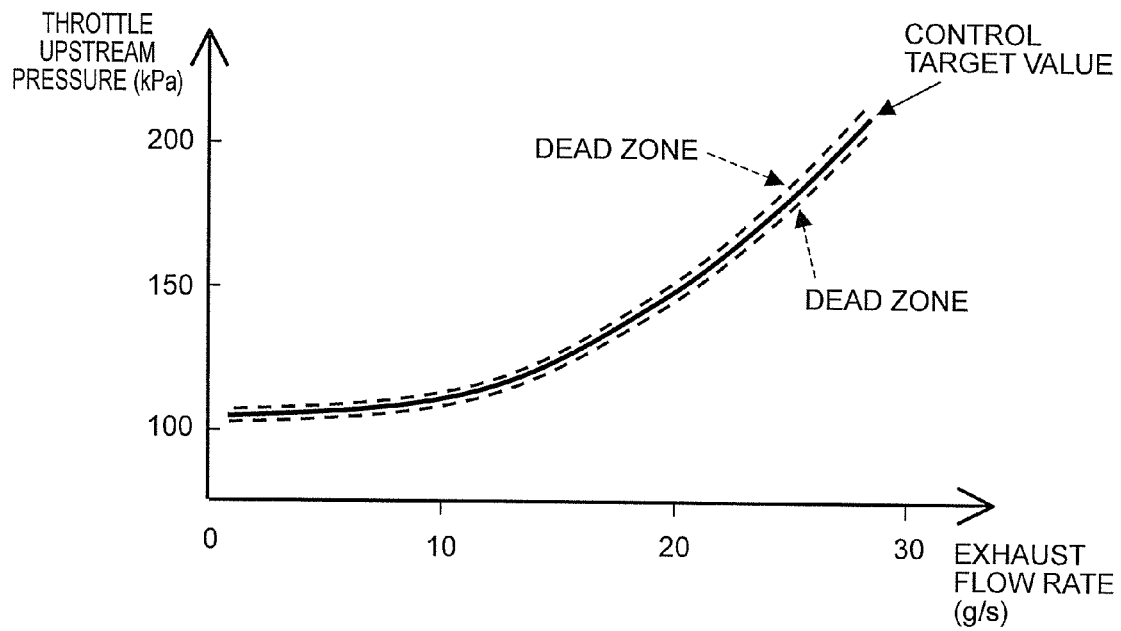
FIG. 7 is an explanatory graph showing an example of the target throttle upstream pressure (control target value) and a behavior of a dead zone according to the first embodiment of the present invention.

Here, the determination by the throttle upstream-pressure determining section 29 is specifically described referring to FIG. 7. FIG. 7 is an explanatory graph showing an example of the target throttle upstream pressure (control target value) and a behavior of a dead zone according to the first embodiment of the present invention. A characteristic of each parameter shown in FIG. 7 is an example when the WGV 19 is in the fully-closed state. Moreover, as shown in FIG. 7, as an exhaust flow rate increases, the throttle upstream pressure exhibits tendency to increase. Therefore, as the exhaust flow rate becomes larger, a gradient of increase becomes larger.

Then, in Step S104, when a difference between the target throttle upstream pressure and the actual throttle upstream pressure falls within an allowable range, the throttle upstream-pressure determining section 29 determines that the opening control performed by the WGV operation command section 28 is in the appropriate control state (that is, Yes). In this case, the actual throttle upstream pressure is controlled within the range of the dead zone. Therefore, it can be said that the actual throttle upstream pressure is equal to the target throttle upstream pressure.

Subsequently, in Step S105, the WGV opening learning-value calculating section 33 stores the calibration value, which is obtained by calibrating the WGV opening sensor 95, as the learning value in the storage section for update. Moreover, in Step S105, the target WGV opening calculating section 25 corrects the shift between the detected WGV opening and the true WGV opening based on the learning value newly updated in the storage section. Thereafter, the processing series is terminated. Subsequently, the processing series proceeds to a next processing cycle.

On the other hand, in Step S104, when the difference between the target throttle upstream pressure and the actual throttle upstream pressure does not fall within the allowable range, the throttle upstream-pressure determining section 29 determines that the opening control performed by the WGV operation command section 28 is in an inappropriate control state (that is, No). In this case, the actual throttle upstream pressure is not controlled within the range of the dead zone. Therefore, it cannot be said that the actual throttle upstream pressure is equal to the target throttle upstream pressure.

Next, in Step S106, the throttle upstream-pressure determining section 29 determines whether or not the actual throttle upstream pressure is smaller than the target throttle upstream pressure. Then, in Step S106, when the throttle upstream-pressure determining section 29 determines that the actual throttle upstream pressure is smaller than the target throttle upstream pressure (that is, Yes), the processing series proceeds to Step S107. In this case, the actual throttle upstream pressure has not reached the target throttle upstream pressure.

Subsequently, in Step S107, the target WGV opening calculating section 25 subtracts the first opening from the target WGV opening calculated by itself. After the processing series is terminated, the processing series proceeds to a next processing cycle. In this case, the WGV 19 operates to the closing side. Therefore, the actual throttle upstream pressure increases to be closer to the target throttle upstream pressure.

On the other hand, in Step S106, when the throttle upstream-pressure determining section 29 determines that the actual throttle upstream pressure is larger than the target throttle upstream pressure (that is, No), the processing series proceeds to Step S108. In this case, the actual throttle upstream pressure exceeds the target throttle upstream pressure.

Subsequently, in Step S108, the target WGV opening calculating section 25 adds the second opening to the target WGV opening calculated by itself. After the processing series is terminated, the processing series proceeds to a next processing cycle. In this case, the WGV 19 operates to the opening side. Therefore, the actual throttle upstream pressure decreases to be closer to the target throttle upstream pressure.

As described above, according to the first embodiment, when the target WGV opening, which does not correspond to the shift of the reference position with respect to the full-closure position of the WGV, is equal to or smaller than the prescribed threshold opening, a change in the throttle upstream pressure or in the driving current of the WGA is monitored while the opening/closing operation of the WGV is being performed based on the target WGV opening after the prescribed opening (given opening) is added or subtracted. In this manner, the optimal target WGV opening corresponding to the shift of the reference position with respect to the full-closure position of the WGV is determined. In this manner, even when the reference position is shifted from the full-closure position of the WGV, the WGV can be controlled to be placed in the desired open/closed state at low cost. Therefore, the throttle upstream pressure can be appropriately controlled, while the WGA can be protected from the overcurrent state.

What is claimed is:

1. A wastegate valve control device for an internal combustion engine, the wastegate valve control device comprising:
   a wastegate valve and
   a computer programmed to:
      perform opening control over the wastegate valve so that a detected opening, which is obtained by a wastegate valve opening sensor, becomes equal to a target opening in order to perform control so that an actual throttle upstream pressure detected by a throttle upstream-pressure detecting section, which corresponds to a pressure in a portion located upstream of a throttle valve provided in an intake path of the internal combustion engine, becomes equal to a target throttle upstream pressure;
      determine that the opening control is in an appropriate control state when a difference between the target throttle upstream pressure and the actual throttle upstream pressure falls within an allowable range, determine that the opening control is in an inappropriate control state and determine whether the actual throttle upstream pressure is larger or smaller than the target throttle upstream pressure when the difference falls out of the allowable range; and
      generate a corrected target opening to obtain the appropriate control state by correcting the target opening by a given opening in a direction in which the actual throttle upstream pressure becomes closer to the target throttle upstream pressure when the target opening is equal to or smaller than a prescribed threshold opening and the opening control is determined to be in the inappropriate control state, and repeating the correction of the target opening through the opening control using the corrected target opening until the opening control is determined to be in the appropriate control state;
wherein the wastegate valve is opened to the corrected target opening.

2. The wastegate valve control device for an internal combustion engine according to claim 1, wherein the computer is further programmed to terminate the correction of the target opening and to store, in a storage section as a learning value, a calibration value for matching a currently-detected value by the wastegate valve opening sensor with a current value of the target opening when the correction of the target opening is terminated,
wherein the computer is further programmed to use the learning value stored in the storage section to correct the detected opening by the wastegate valve opening sensor.

3. The wastegate value control device for an internal combustion engine according to claim 1, wherein the computer is further programmed to determine whether or not a driving current of an actuator for operating the wastegate valve is smaller than a prescribed threshold current,
wherein the corrected target opening is generated to obtain the appropriate control state by correcting the target opening by the given opening in a direction in which the driving current of the actuator becomes closer to a normal state when the target opening is equal to or smaller than the prescribed threshold opening and the driving current of the actuator is determined to be in an overcurrent state, and the correction of the target opening is repeated through the opening control using the corrected target opening until the driving current of the actuator is determined to be in the normal state.

4. The wastegate valve control device for an internal combustion engine according to claim 3, wherein the computer is further programmed to terminate the correction of the target opening and to control the storing, in a storage section as a learning value, a calibration value for matching a currently-detected value by the wastegate valve opening sensor with a current value of the target opening when the correction of the target opening is terminated,
wherein the computer is further programmed to use the learning value stored in the storage section to correct the detected opening by the wastegate valve opening sensor.

5. The wastegate valve control device for an internal combustion engine according to claim 1, wherein the computer is further programmed to correct the target opening by adding the given opening to the target opening so that the actual throttle upstream pressure becomes closer to the target throttle upstream pressure when the target opening is equal to or smaller than the prescribed threshold opening the opening control is determined to be in the inappropriate control state and the actual throttle upstream pressure is determined to be larger than the target throttle upstream pressure.

6. The wastegate valve control device for an internal combustion engine according to claim 5, wherein the computer is further programmed to control storing, in a storage section as a learning value, a calibration value for matching a currently-detected value by the wastegate valve opening sensor with a current value of the target opening when the correction of the target opening is terminated,
wherein the computer is further programmed to use the learning value stored in the storage section to correct the detected opening by the wastegate valve opening sensor.

7. The wastegate value control device for an internal combustion engine according to claim 5, wherein the computer is further programmed to determine whether or not a driving current of an actuator for operating the wastegate valve is smaller than a prescribed threshold current,
wherein the corrected target opening is generated to obtain the appropriate control state by correcting the target opening by the given opening in a direction in which the driving current of the actuator becomes closer to a normal state when the target opening is equal to or smaller than the prescribed threshold opening and the driving current of the actuator is determined to be in an overcurrent state, and the correction of the target opening is repeated through the opening control using the corrected target opening until the driving current of the actuator is determined to be in the normal state.

8. The wastegate valve control device for an internal combustion engine according to claim 7, wherein the computer is further programmed to terminate the correction of the target opening and to control storing, in a storage section as a learning value, a calibration value for matching a currently-detected value by the wastegate valve opening sensor with a current value of the target opening when the correction of the target opening is terminated,
wherein the computer is further programmed to use the learning value stored in the storage section to correct the detected opening by the wastegate valve opening sensor.

9. The wastegate valve control device for an internal combustion engine according to claim 1, wherein the computer is further programmed to correct the target opening by subtracting the given opening from the target opening so that the actual throttle upstream pressure becomes closer to the target throttle upstream pressure when the target opening is equal to or smaller than the prescribed threshold opening and the opening control is determined to be in the inappropriate control state and the actual throttle upstream pressure is determined to be smaller than the target throttle upstream pressure.

10. The wastegate valve control device for an internal combustion engine according to claim 9, wherein the computer is further programmed to terminate the correction of the target opening and to store, in a storage section as a learning value, a calibration value for matching a currently-detected value by the wastegate valve opening sensor with a current value of the target opening when the correction of the target opening is terminated,
wherein the computer is further programmed to use the learning value stored in the storage section to correct the detected opening by the wastegate valve opening sensor.

11. The wastegate value control device for an internal combustion engine according to claim 9, wherein the computer is further programmed to determine whether or not a driving current of an actuator for operating the wastegate valve is smaller than a prescribed threshold current,
wherein the corrected target opening is generated to obtain the appropriate control state by correcting the target opening by the given opening in a direction in which the driving current of the actuator becomes closer to a normal state when the target opening is equal to or smaller than the prescribed threshold opening and the driving current of the actuator is determined to be in an overcurrent state, and the correction of the target opening is repeated through the opening control using the corrected target opening until the driving current of the actuator is determined to be in the normal state.

12. The wastegate valve control device for an internal combustion engine according to claim 11, wherein the computer is further programmed to terminate the correction of the target opening and to control storing, in a storage section as a learning value, a calibration value for matching a currently-detected value by the wastegate valve opening sensor with a current value of the target opening when the correction of the target opening is terminated, wherein the computer is further programmed to use the learning value stored in the storage section to correct the detected opening by the wastegate valve opening sensor.

13. A wastegate valve control method for an internal combustion engine, which is performed by a wastegate valve control device for an internal combustion engine comprising a computer programmed to perform opening control over a wastegate valve so that a detected opening, which is obtained by a wastegate valve opening sensor, becomes equal to a target opening in order to perform control so that an actual throttle upstream pressure detected by a throttle upstream-pressure detecting section, which corresponds to a pressure in a portion located upstream of a throttle valve provided in an intake path of the internal combustion engine, becomes equal to a target throttle upstream pressure, the wastegate valve control method comprising:
determining that the opening control is in an appropriate control state when a difference between the target throttle upstream pressure and the actual throttle upstream pressure falls within an allowable range, and determining that the opening control is in an inappropriate control state and determining whether the actual throttle upstream pressure is larger or smaller than the target throttle upstream pressure when the difference falls out of the allowable range;
generating a corrected target opening to obtain the appropriate control state by correcting the target opening by a given opening in a direction in which the actual throttle upstream pressure becomes closer to the target throttle upstream pressure when the target opening is equal to or smaller than a prescribed threshold opening and when it is determined that the opening control is in the inappropriate control state, and repeating the correction of the target opening through the opening control using the corrected target opening until it is determined that the opening control is in the appropriate control state; and
opening the wastegate valve to the corrected target opening.

* * * * *